United States Patent
Ledwith et al.

(10) Patent No.: US 10,680,997 B2
(45) Date of Patent: *Jun. 9, 2020

(54) NETWORK MESSAGING FOR PAIRED DEVICES

(71) Applicant: Apple Inc., Cupertino, CA (US)

(72) Inventors: Alexander Ledwith, Santa Cruz, CA (US); Christopher C. Jensen, Santa Cruz, CA (US); John J. Iarocci, Cupertino, CA (US); Marc J. Krochmal, Santa Clara, CA (US); Ziv Wolkowicki, Cupertino, CA (US); Daniel B. Pollack, San Francisco, CA (US); Darin B. Adler, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/108,576

(22) Filed: Aug. 22, 2018

(65) Prior Publication Data

US 2019/0028423 A1 Jan. 24, 2019

Related U.S. Application Data

(63) Continuation of application No. 14/872,134, filed on Sep. 30, 2015, now Pat. No. 10,069,785.

(Continued)

(51) Int. Cl.
*H04L 12/58* (2006.01)
*H04L 29/08* (2006.01)

(52) U.S. Cl.
CPC .......... *H04L 51/36* (2013.01); *H04L 67/06* (2013.01); *H04L 67/26* (2013.01); *H04L 51/38* (2013.01)

(58) Field of Classification Search
None
See application file for complete search history.

(56) References Cited

U.S. PATENT DOCUMENTS

| | | | |
|---|---|---|---|
| 7,873,849 B2 * | 1/2011 | Mucignat | G06F 1/3203 713/323 |
| 8,010,167 B2 * | 8/2011 | Cotevino | H04W 4/16 455/574 |

(Continued)

OTHER PUBLICATIONS

Watchapp Communication product data sheet, Pebble Technology Corporation, [online], [retrieved May 20, 2015], retrieved from the internet, URL: https://developer.getpebble.com/guides/pebble-apps/communications/, 3 pages.

(Continued)

*Primary Examiner* — Ninos Donabed
(74) *Attorney, Agent, or Firm* — Kilpatrick, Townsend and Stockton LLP

(57) ABSTRACT

Messaging between a companion device and an accessory device is controlled such that different modes of communication may be utilized. The different modes can implement different messaging strategies, each of which is intended for efficient power management, in view of the limited electrical power that is typically available at the accessory device. A received request message for sending from the companion device to the accessory device is sent if predetermined conditions apply, and similarly for messages from the accessory device to the companion device.

17 Claims, 10 Drawing Sheets

Related U.S. Application Data

(60) Provisional application No. 62/171,917, filed on Jun. 5, 2015.

(56) References Cited

U.S. PATENT DOCUMENTS

| | | | | |
|---|---|---|---|---|
| 8,407,306 | B1* | 3/2013 | Nerieri | H04L 12/6418 |
| | | | | 709/206 |
| 8,751,592 | B2* | 6/2014 | Garcia | H04W 52/0261 |
| | | | | 709/206 |
| 9,068,887 | B1* | 6/2015 | Bennouri | G01J 1/429 |
| 9,930,561 | B2 | 3/2018 | Boodannavar et al. | |
| 10,069,785 | B2 | 9/2018 | Ledwith et al. | |
| 2004/0204183 | A1* | 10/2004 | Lencevicius | H04M 1/663 |
| | | | | 455/574 |
| 2007/0298762 | A1* | 12/2007 | Morris | H04W 52/0203 |
| | | | | 455/405 |
| 2008/0147911 | A1 | 6/2008 | Hitt | |
| 2008/0162706 | A1 | 7/2008 | Tailor et al. | |
| 2008/0162760 | A1* | 7/2008 | Jacob | G06F 13/1642 |
| | | | | 710/244 |
| 2009/0318177 | A1 | 12/2009 | Wang et al. | |
| 2011/0060803 | A1* | 3/2011 | Barlin | G06Q 30/02 |
| | | | | 709/206 |
| 2011/0072099 | A1* | 3/2011 | Harju | H04L 51/066 |
| | | | | 709/206 |
| 2011/0072101 | A1* | 3/2011 | Forssell | H04W 48/04 |
| | | | | 709/206 |
| 2011/0074596 | A1* | 3/2011 | Frohlick | H04W 4/90 |
| | | | | 340/691.1 |
| 2011/0090801 | A1* | 4/2011 | Oku | H04L 12/14 |
| | | | | 370/246 |
| 2011/0151884 | A1* | 6/2011 | Zhao | H04W 72/1205 |
| | | | | 455/452.1 |
| 2012/0077433 | A1 | 3/2012 | Walker et al. | |
| 2012/0084592 | A1* | 4/2012 | Lin | G06F 1/266 |
| | | | | 713/324 |
| 2012/0209946 | A1 | 8/2012 | McClure et al. | |
| 2012/0214526 | A1 | 8/2012 | Selén et al. | |
| 2012/0240119 | A1 | 9/2012 | Xie et al. | |
| 2013/0054758 | A1 | 2/2013 | Imes et al. | |
| 2013/0117381 | A1* | 5/2013 | Garcia | H04W 52/0261 |
| | | | | 709/206 |
| 2013/0267171 | A1 | 10/2013 | Sarkar et al. | |
| 2013/0318154 | A1 | 11/2013 | Jacobson et al. | |
| 2013/0337864 | A1 | 12/2013 | Narayanan et al. | |
| 2015/0039606 | A1* | 2/2015 | Salaka | G06F 16/3326 |
| | | | | 707/730 |
| 2015/0177063 | A1* | 6/2015 | Lian | G01J 1/0403 |
| | | | | 250/372 |
| 2016/0189440 | A1* | 6/2016 | Cattone | G07C 5/008 |
| | | | | 701/31.5 |
| 2016/0359666 | A1 | 12/2016 | Ledwith et al. | |

OTHER PUBLICATIONS

U.S. Appl. No. 14/872,134, "Corrected Notice of Allowance," dated May 11, 2018, 6 pages.
U.S. Appl. No. 14/872,134, "Notice of Allowance," dated Apr. 26, 2018, 9 pages.
U.S. Appl. No. 14/872,134, "Final Office Action," dated Oct. 18, 2017, 14 pages.
U.S. Appl. No. 14/872,134, "Non-Final Office Action," dated Jun. 16, 2017, 9 pages.

* cited by examiner

NETWORK MESSAGING FOR PAIRED DEVICES

CROSS-REFERENCES TO RELATED APPLICATIONS

This application is a continuation of U.S. patent application Ser. No. 14/872,134, filed Sep. 20, 2015, which claims the benefit of and priority to U.S. Provisional Application No. 62/171,917, filed Jun. 5, 2015; and is related to commonly owned U.S. Provisional Application No. 62/171,952, filed Jun. 5, 2015; and U.S. Provisional Application No. 62/171,978, filed Jun. 5, 2015, the entire contents of which are incorporated herein by reference for all purposes.

FIELD

The present disclosure relates generally to wireless electronic devices and in particular to management of power consumption during messaging between communicating devices.

BACKGROUND

There are numerous examples of personal computing devices, also called accessory devices, that generally are mobile and are carried about. Such devices typically have somewhat limited computing resources, such as computing processor power, battery power, and memory storage space, as compared to devices with which they communicate. Conservation of electrical power for such devices is important. Such accessory devices are typically paired with a device of greater computing resources, such as a table computer or a smart phone, or a desktop computer or laptop computer. For example, the "Apple Watch" accessory device from Apple Inc. is a wristwatch-style personal computing device that is worn by a user and is typically paired with an "iPhone" smart phone for network communications and receiving data.

BRIEF SUMMARY

As disclosed herein, messaging between a companion device and an accessory device is controlled such that different modes of communication may be utilized. The different modes can implement different messaging strategies, each of which is intended for efficient power management, in view of the limited electrical power that is typically available at the accessory device. A received request message for sending from the companion device to the accessory device is sent if the received request message is associated with an interactive transfer mode of communication operation, if the accessory device is available, and if the corresponding accessory application is on a list of active accessory device applications received from the accessory device. The received request message is otherwise stored in memory of the companion device, for sending at a time when the accessory device is available and the corresponding accessory application is on the list of active accessory device applications. If the received request message is associated with a push update background transfer mode of communication operation, then the message is sent if the accessory device is available, for storage at the accessory device. The message is otherwise stored in memory of the companion device, for sending at a time when the accessory device is available. The message is sent to the accessory device by initiating a file transfer process, if the received request message is associated with a file sending background transfer mode of communication operation and if the received request message identifies one or more files for transferring to the accessory device, and if a count of transferred files does not exceed a file transfer limit value within a predetermined time. The message is otherwise stored in memory of the companion device for sending at a time when the accessory device is available. The file transfer process is placed in a pause condition if time expended during the file transfer process exceeds a predetermined value, and the file transfer process is changed from the paused condition to a condition in which the file transfer process is resumed, if a predetermined resume condition is satisfied.

A better understanding of the nature and advantages of embodiments of the present invention may be gained with reference to the following detailed description and the accompanying drawings.

DETAILED DESCRIPTION

Figure 1:
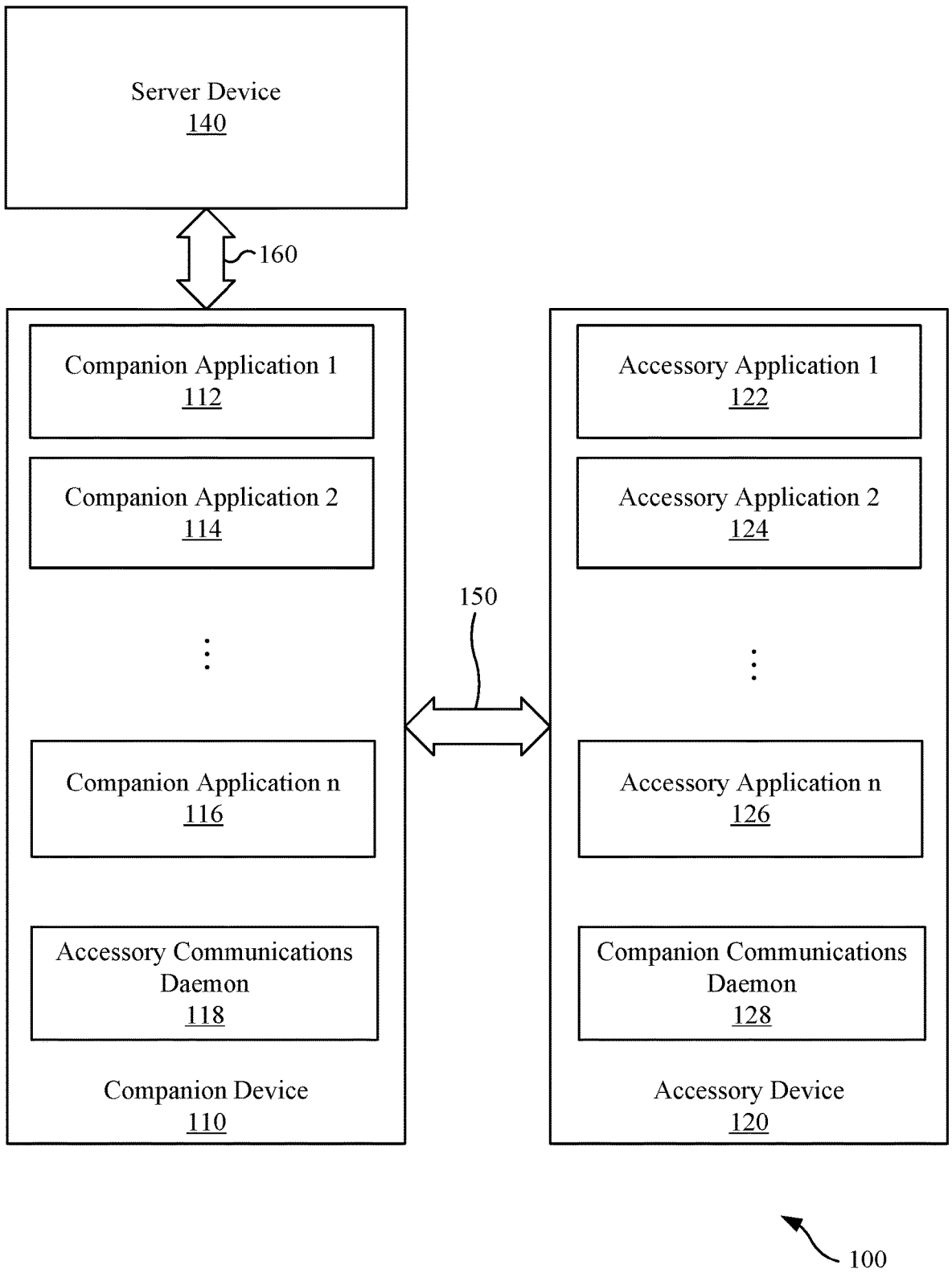
FIG. 1 is a block diagram of a system that supports messaging between a companion device and an accessory device for efficient power management at the accessory device.

A companion device that is paired with an accessory device includes a companion application that communicates with the accessory application on the paired accessory device and no others. To support data transfer while promoting efficient power consumption on the accessory device, the respective paired applications communicate with each other by establishing communication sessions between the respective devices via respective communications daemons of each of the respective devices.

In accordance with the disclosure, communications between corresponding applications installed on a companion device and an accessory may occur according to one of four different operating modes. The operating modes comprise two background modes, one an application update context type of background mode and the other a file transfer type of background mode, as well as an interactive transfer mode and a complication push update mode.

Each device includes an application that is installed at the device for performing a function, and a corresponding application for the same function is installed on the other device, with which the device is paired. For example, an accessory device that is paired with the companion device includes an application that is paired with a corresponding application on the companion device that communicates with the accessory application and no others.

To support data transfer while managing power consumption on the accessory device, the respective paired applications communicate with each other by communicating according to the four modes of operation, which are configured for efficient power management for data transfers. Third party applications that are installed on the companion device and the accessory device may utilize the modes of operation to communicate with each other. The third party applications may be configured by the application developers to use one or more of the operation modes to support data transfers in the operation of their application. The operation modes are available as part of the respective operating systems and are configured to conserve power.

In the complication push update mode, support is provided for managing change of icons and information shown on the display of the accessory device. The accessory device may comprise, for example, a device such as the "Apple Watch". The icons and information that are displayed and changed on the accessory device display are generally referred to, on the Apple Watch for example, as "complications". Changes of icons and/or information to the complications on the accessory device are permitted only if the watch application is reachable. In this communication mode, if a complication change is requested at the companion device, such as by the companion application contacting a Complication User Interface, the companion application is entitled to contact the corresponding watch application up to a predetermined number of times in a 24-hour period. Within the predetermined number of times, the contact by the companion device will result in initiating operation of the watch application, which becomes reachable, so that the data transfer occurs. For example, with the Apple Watch, a companion application may typically be entitled to contact the Apple Watch for data transfer using this mode of operation and communication for up to fifty transfers per day. If a contact is authorized by the Complication UI, then the companion application is operated in the Interactive operation mode for initiating operation of the watch application and initiating data transfer I. Communication Between the Companion Device and the Accessory Device FIG. 1 shows a block diagram of a system that supports messaging between a companion device and an accessory device for efficient power management at the accessory device.

A. Configuration of the Devices

FIG. 1 is a block diagram of a system 100 that supports communication between a companion device 110 and an accessory device 120. Data for either or both of the devices 110, 120 may come from a server device 130 that communicates with the companion device via a wireless or wired network connection 140. The devices 110, 120, 130 may be any kind of computing device capable of network communications, such as, for example, a desktop computer, a laptop computer, a tablet computer, a mobile phone (e.g., a Smartphone), a media player, a personal digital assistant (PDA), a gaming device, and the like. The companion device 110, for example, may comprise an "iPhone" or "iPad" device available from Apple Inc. of Cupertino, Calif., USA. The accessory device 120 may comprise, for example, an "Apple Watch" available from Apple Inc. of Cupertino, Calif., USA.

B. Communications Between the Devices

Each respective paired device includes a communications daemon for managing communications between the two paired devices. For example, FIG. 1 shows that the companion device 110 includes an accessory communications daemon 118, which the companion device uses for communication with the accessory device 120 over a network connection 150. Similarly, FIG. 1 shows that the accessory device 120 includes a companion communications daemon 128, which the accessory device uses for communication with the companion device 110 over the network connection 150. An electronic watch, such as the accessory device 120, can communicate with a companion device to obtain updated information, e.g., for a complication. For example, a sports application can execute on a companion device, retrieve sports data from a server, and provide the sports data to the watch for displaying in a complication. Various mechanisms can exist on the companion device and the watch to control how and when such complication data is provided.

To obtain new complication data, a companion application may need to be woken up (launched). Embodiments can determine triggers for launching a companion application, e.g., based on previous uses of the companion application or a corresponding watch application. Once a particular companion application is launched, the companion can instruct the particular companion application to obtain new data, e.g., from a server. New complication data can also be pushed by a server. Modules on the companion can determine when to send the complication data, e.g., based on any one or more of usage of both devices, power states of both devices, and user preferences. A watch application and/or system routines on the watch can process the new complication data, e.g., determining how to display. And, then the new complication data can be displayed.

C. System Diagram

Figure 2:
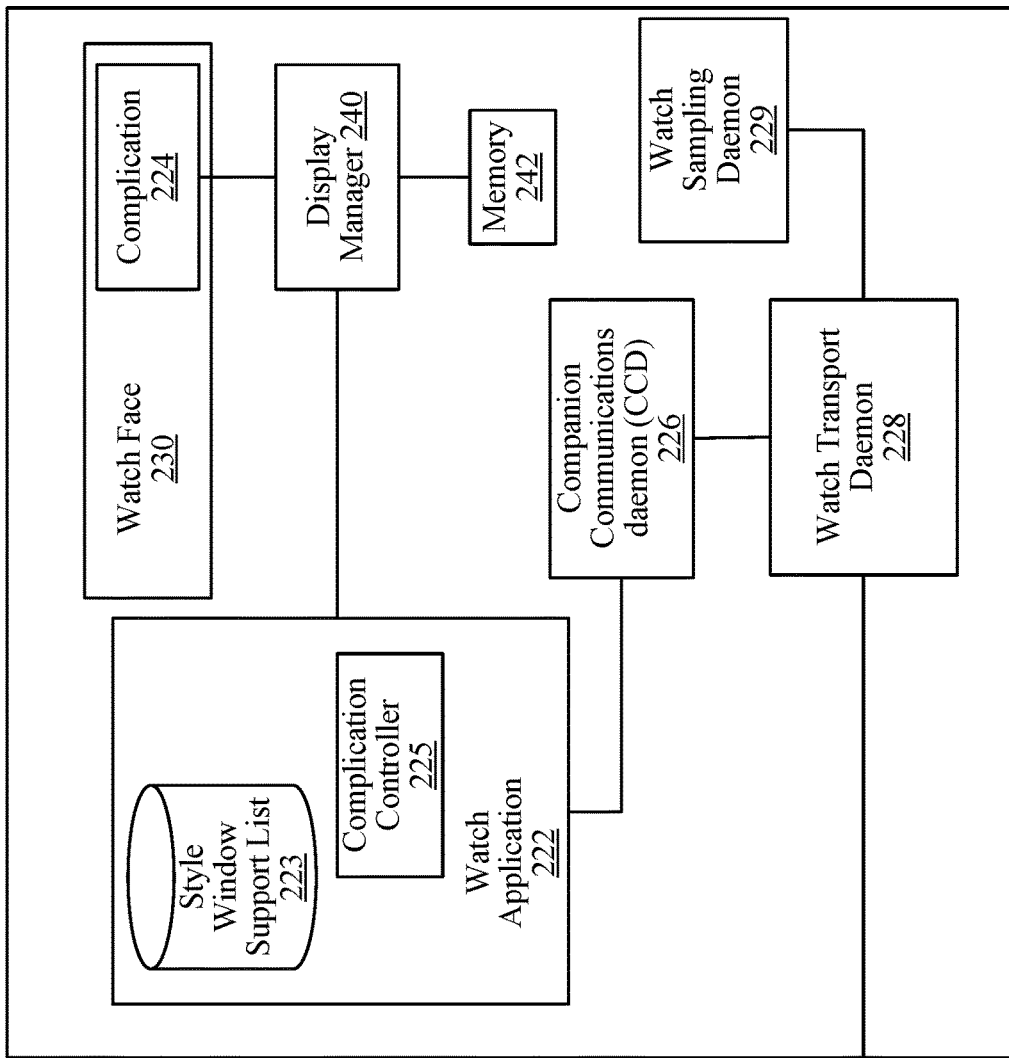
FIG. 2 shows a system of a companion device in communication with an accessory device according to embodiments of the present invention.
Figure 2:
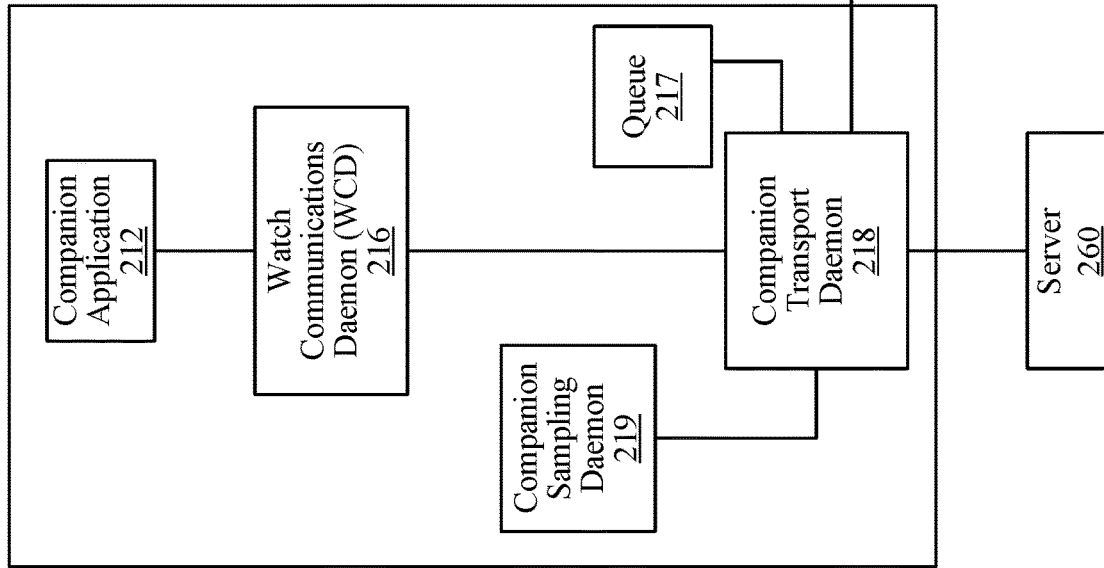

FIG. 2 shows a system 200 of a companion 210 in communication with a watch 220 according to embodiments of the present invention. Lines in FIG. 2 correspond to communications that occur in either direction.

An application package for a particular software application can include software components for companion 210 and for watch 220, e.g., a companion application 212 and a watch application 222, respectively. For example, a news application from a particular publisher (e.g., for a particular newspaper, TV show, or website) can have one component that runs on companion 210 and a corresponding component that runs on watch 220. In addition, the software application can include an application extension (not shown). The application extension can be used for communications between the watch application 222 and the companion application 212. The application extension can execute on the watch or the companion. These software components can execute independently or together, e.g., as part of providing updated complication data to watch 220. In other embodiments, the software components can be downloaded separately to the two device. Companion application 212 and watch application 222 are examples of client applications.

Companion application 212 can function as a standalone application that operates on companion 210 without any need to interact with watch 220. Companion application 212 may include an extension that is used to communicate with watch 220. Such an extension could be downloaded and installed separately from companion application, e.g., to provide add-on functionality.

A watch communications daemon (WCD) 216 can determine how communications are to occur with watch 220. WCD 216 can determine a particular manner for sending any data (e.g., complication data) from companion application 212 to watch 220. For example, WCD 216 can determine which watch applications are currently running, and only send data to a particular watch application when that watch application is running. If the particular watch application is not running, then the data can be queued. As other examples, WCD can perform background process for sending data (e.g., files) according to specified rules, e.g., send data for a specified amount of time, and when not finished then pause (e.g., so that other data can be sent).

WCD 216 can also process any data such that the data is in a format that can be determined by watch 220. For example, companion application 212 may send the data in a same format regardless of the destination device, and WCD 216 can translate the data into a format suitable for a watch. For example, only higher level communication options may be exposed to the companion applications, and all of the lower-level options available to a companion transport daemon (CTD) 218 may not be exposed to the companion application. WCD 216 can perform the translation between the higher-level concepts in a low-level features of CTD 218. Other daemons can do processing for other types of devices.

WCD 216 can also translate data received from watch 220 into a format that is readable by companion application 212, or any companion application. WCD 216 can also interpret one or more request commands from watch 220, where the request commands request data (e.g., complication data) from companion application 212, or other companion applications. WCD 216 can then send a request for the data in a suitable format to the companion application. WCD 216 can interact with an application manager (not shown) that can launch a companion application, if needed.

CTD 218 can transmit data to and receive data from watch 220. WCD 216 can provide logic for determining specifically how to communicate with watch 220, while CTD 218 can communicate with various other devices besides a watch. CTD 218 may be an identity services daemon, e.g., as described in U.S. patent application Ser. No. 14/475,060 entitled "Proxied Push" filed Sep. 2, 2014, the disclosure of which is incorporated by reference in its entirety. WCD 216 and CTD 218 can be part of an operating system of companion 210.

If WCD 216 determines that data should not be sent, WCD 216 may decide not to provide the data to CTD 218. WCD 216 can do this in a variety of ways. For example, WCD 216 may not inform companion application 212 the data should be sent. As another example, WCD 216 inform companion application 212 at the data cannot be sent, and thus companion application 212 can wait until later to try and send the data. In yet another example, WCD 216 can queue the data. WCD 216 can further track which data has not been sent, and potentially remind companion application 212 at a later time.

A companion sampling daemon (CSD) 219 can track interactions of the user with the device as events, and determine predictive interactions and respond proactively. CSD 219 can be in communication with other modules on companion 210, e.g., an application manager. For example, CSD 219 can determine when a particular companion application should retrieve data for sending to watch 220, e.g., when to obtain new complication data as part of an update. As another example, CSD 219 can track user interactions with watch 220 (e.g., by receiving tracking information from watch 220) and determine when to retrieve and send data to watch 220. CSD 219 can perform such determinations by creating models and determining prediction probabilities for how a user might interact with companion 210. Further details for sampling demons and a transport daemon (e.g., a push daemon) can be found in U.S. Patent Publication 2014/0366041.

In some embodiments, CTD 218 can queue data in queue 217 to preserve battery life of watch 220, and send the queued data when other data is requested by watch 220 or when other data is sent to watch 220 (e.g., when certain high-priority data is sent or a sufficient amount of data is to be sent). For example, certain data (or certain companion applications) can be flagged to allow sending of data at times when other data would not be sent, e.g., regardless of a current state of watch 220. When CTD 218 cues the data, WCD 216 can store a record of what the content is, so that when a response is received in response to a particular message, the response can be associated with a particular message that was sent.

A watch transport daemon (WTD) 228 on watch 220 can communicate data sent to/from CTD 218. A companion communications daemon (CCD) 226 can provide protocols for specifically communicating with companion 210. CCD 226 can provide translation of communications to and from watch applications, such as watch application 222. A watch sampling demon (WSD) 229 can track previous user interactions with watch 220 in a similar manner that CSD 219 can track user interactions with companion 210. WSD 229 can also make predictions for how a user might interact with watch 220. In response to such predictions, WSD 229 can cause data to be requested from companion 210.

Watch application 222 can include a style window support list 223 that identifies the style windows that watch application 222 supports. Certain watch applications may only support certain style windows. In some embodiments, if a watch application supports a style window, the support applies for all watch faces that use that particular style window. In one embodiment, watch application 222 can run code from a developer in an extension, and the system can provide code that ensures data from the developer's code is interpreted properly by system modules, such as display manager 240.

A complication controller 225 can determine how and when complication data is sent to a display manager 240, which can manage displaying of data on a screen of watch 220. Complication 224 can be generated as an object on a watch face 230, and complication 224 can be specifically associated with watch application 222. The complication data can be sent from companion application 212 through various components over to watch 220. In some embodiments, complication controller 225 can determine a specific template corresponding to a style window being used to display complication 224.

Complication controller 225 can create a complication data object according to the selected template, and send the complication data object to display manager 240. Display manager 240 can identify the template that is used in identify the new complication data. Based on the specific template used, display manager 240 can determine how to display the new complication data, e.g., using other settings for watch face 230, such as color or presentation style.

In some embodiments, when watch application 222 is launched in the foreground, a command can be sent to companion 210 to launch companion application 212 so that any data can be transferred between the two applications. In one example, watch application 222 can be launch and receive user input to transfer one or more files from companion 210 using companion application 212. When watch application 222 is only running in the background, watch application 222 can be disabled from launching companion application 212.

Companion 210 and/or watch 220 can track which applications currently provide complication data to watch face 230. Such information can be used to determine which applications can transfer data between companion 210 and watch 220. Further, watch 220 can determine which watch applications can support a particular style window, e.g., by looking at the support lists in each of the watch applications. Such information can be used when configuring a watch face.

Complication controller 225 can provide a preferred data refresh rate for how often the data in a complication is to be refreshed. This data refresh rate can be used to determine how often to request data from companion 210, or how often companion 210 is to first data to watch 220. In various embodiments, CSD 219 and WSD 229 can use the data refresh rate along with other factors (e.g., power state and other predicted user interactions) to determine how often to update complication 224 on watch face three. Thus, the preferred refresh rate can be overridden based on system considerations (power, etc.). The preferred refresh rate can be defined in various ways, e.g., a time for a next update, an amount of updates per time period, an amount of data per time period, and like, as well as combination thereof. In some embodiments, complication controller 225 can make an interactive request to obtain new complication data Display manager 240 can show the icons of watch apps and host the watch faces. Display manager 240 can act as a carousel application to provide information when needed. In some embodiments, display manager 240 can access complication data in a memory 242, which may store historical and/or future complication data. Memory 242 can be various types of memory and include different memory modules of different types for different purposes. For example, memory 242 can include a cache that acts as operating memory for currently running process and a persistent memory (e.g., flash memory) that can store data after a device is turned off.

Display manager 240 can know the companion applications that can provide complication data to watch face 230, and decide, based on resources, when to wake up a particular companion application. In other implementations, such a determination can be made by WSD 229, which may be in communication with display manager 240, or made by both. Display manager 240 can determine how long to cache the data in memory 242 to keep watch face 230 responsive, but also not bogged down with excessive caching.

Companion application 212 can get updated complication data from a server 260. Different companion applications can correspond with different servers. Thus, a server might provide updated data for a particular complication. A server might be associated with a particular topic (also called a feed).

In one example, assume there are two watch faces with five different complications on each watch face, and a user switches to a different watch face. A list of active complications can be updated on companion 210 and/or watch 220. Companion 210 can inform any servers associated with an active complication (e.g., based on active topics), and inform any servers that were associated with an active complication but are no longer. The servers can now change a deliberate priority for pushes to companion 210 based on the active state of a complication on watch 220. For example, a server for a complication on an active list would have pushes to companion 210 be low priority. Such low priority data can be sent to watch 220 only when it is awake or when other data is sent, as can data sent from server 260 to companion 210, while messages that are for the currently active complications can get a special treatment where they can wake up the phone. In some implementations, high priority messages from server 260 can wake up companion 210, whereas lower priority ones can wait until companion 210 wakes up.

In some embodiments, messages with a regular or low priority on companion 210 can be sent to watch 220 when the watch requests data, or other data is being sent. For example, a user may have requested the file to be transferred, and other messages can be sent at that time since watch 220 is known to be awake. Messages can increase in priority the longer they wait in the queue, and finally be transferred immediately when a connection is made to watch 220, if the amount of time has become sufficiently long.

In other embodiments than shown in FIG. 2, companion application 212 can have an app extension that is designated for communicating with a watch. The application package can include a companion application, an app extension, and a watch application, which may include an interface file specifying how data of the watch application is displayed. In some embodiments, companion 210 can help to install a watch application on watch 220 by downloading the application package and providing the watch application to watch 220.

D. Getting Updates on Companion

New data destined for watch 220 can be received at companion 210 in a variety of ways. The corresponding companion application can be launched to obtain the data. The companion application can be launched in response to a push from a server, e.g., with the latest score of a sports game. As another example, a companion application can be launched in response to a signal from CSD 219, which may be determined that the user is likely to use the companion application and thus the companion application can be launched in the background. Once the companion application is launched, data can be obtained by a push or pull from server. This data can then be sent over to watch 220 according to protocols described above.

In one embodiment, a preferred refresh rate can be sent from watch 220 to companion 210, and a corresponding companion application can periodically fetch the new data from a server. For example, current weather information can be retrieved every hour. In some implementations, CSD 219 may still determine whether or not the preferred refresh rate is going to be honored. A priority of a particular companion application might be used to determine whether to honor the preferred refresh rate. The preferred refresh rate can be based on a developer's settings and/or user input. Thus, CSD 219 may give more weight to the preferred refresh rate for companion with higher priority.

1. Background Process on Companion

In some embodiments, a companion application can choose to opt into being launched in the background to obtain new complication data to send to a watch. The companion application can be periodically launched based on an analysis, e.g., by CSD 219. A companion application can be allotted a certain budget for an amount of data and/or power that can be used in updating data on the watch (e.g., complication data).

As an example background process, CSD 219 can track that a user launches a particular companion application or watch application at a particular time every day, e.g., 9:00 AM. CSD 219 can cause the particular companion application to launch and obtain the new data, and push the new data to the watch. Thus, whether user launches the watch application or views a watch face with a complication corresponding to the watch application, the data is readily available.

2. Pushes from Server

A server can send pushes for things like showing a notification or telling a user that there is new content to fetch. In some embodiments, a server can inform the companion application that there is an update for complication. The message to inform the companion application can include the updated data for the complication. For example, an update to a sports game can be pushed from the server to companion 210, and then push to watch 220.

When a push comes into the companion and is received by WCD 216, the corresponding companion application can be launched. The companion application can process the data, and then send a request to WCD 216 to send any data to watch 220, e.g., send new complication data. Then, depending on any associated scheduling determined by CSD 219, a push message can be sent to watch 220. Watch 220 can receive the push message, and wake up the corresponding watch application. The corresponding complication controller can then provide an updated complication data object to display manager 240 for updating the corresponding complication. The operations on the watch can be the same regardless of how companion 210 obtains the data.

E. Getting Updates to Watch

The companion and watch can exchange information to determine how often to update the complications. In various embodiments, logic in either device can determine an appropriate time for updating the complication data.

In some embodiments, a companion application can send preferences for when and how often the companion application would like to update the complication data, e.g., by specifying a refresh rate. The watch (e.g., by WSD 229 and/or display manager 240) can then determine when to request an update to a complication. The watch can ask the companion for the updated complication data at different points in time, e.g., based on battery level, power consumption, user preferences, and the like. Further, certain actions on watch can prompt a request from the companion, e.g., when the watch application is launched in the foreground.

In other embodiments, the companion application can determine whether to send the complication data to the watch, e.g., based on preferences received from the watch. The companion application 212 corresponds to an active complication, such a companion application can be allowed more budget for sending messages to the watch.

The refresh rate can vary for different companion applications. For example, some complications can refresh every few minutes for certain periods of time, and other complications may only update a few times a day or less. For example, an application that identifies a birthday would likely each refresh no more than once a day. Thus, a companion application may have long periods of downtime with no refreshes. Whereas, a social media application could refresh many times during the day, and a user may want to see many of those refreshes.

Both devices can balance an amount of expected refreshes according to an expected number of refreshes for the complications on an active watch face. In some embodiments, the companion application can have a brief window that may be allowed to update frequently. But, for power reasons, the complications may not be updated frequently for long periods of time.

Figure 3A:
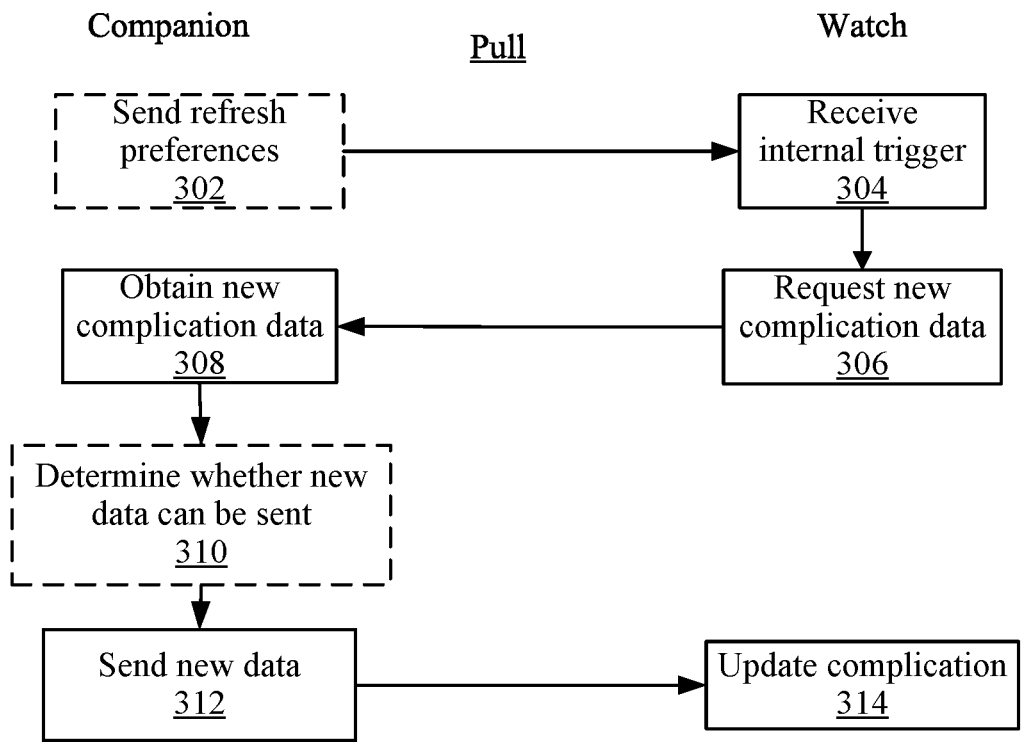
FIG. 3A shows a flowchart of a method where the accessory device requests an update to complication data from a particular companion application according to embodiments of the present invention.
Figure 3B:
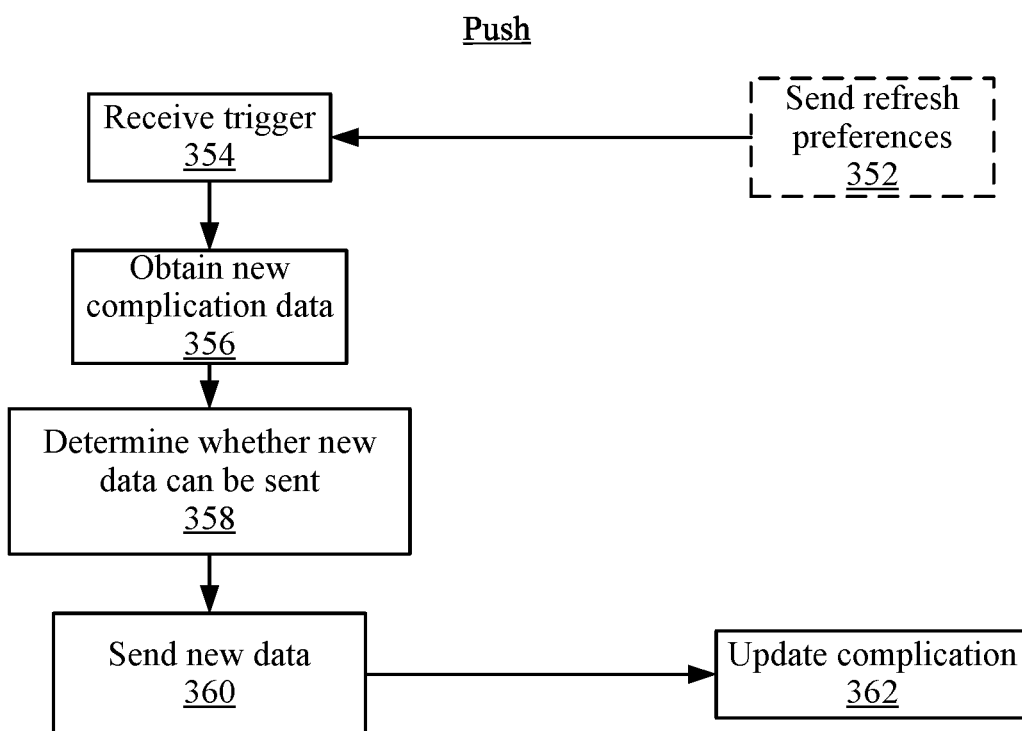
FIG. 3B shows a flowchart of a method where a particular companion application provides an update to complication data to the watch according to embodiments of the present invention.

FIGS. 3A and 3B show flowcharts illustrating steps performed by the companion and the watch for updating applications on the watch with new data.

1. Pull

FIG. 3A shows a flowchart of a method 300 where the watch (e.g., by WSD 229 and/or display manager 240) requests an update to complication data from a particular companion application (app) according to embodiments of the present invention. Various blocks of method 300 can be optional. Method 300 relates to updating a particular complication that corresponds to a particular companion application.

At block 302, the companion application can send refresh preferences. Examples of refresh preferences can include a refresh rate, a starting time for updating complication data (e.g., for a given day or date), and an ending time for updating complication data. The companion application can know that the refresh preferences are simply preferences, and that the actual refresh rate from the watch may differ.

In some embodiments, a complication controller in the companion application can provide the refresh preferences. The complication controller can determine the refresh preferences based on information obtained from the companion app, e.g., expected rates of change of the data and the nature of the data (e.g., certain times the data may be expected to change, as may occur for sporting event).

At block 304, an internal trigger is received. The internal trigger can be generated within the watch, e.g., when it determines a suitable time to update the complication data with a particular companion application. Such a determination can be based on the particular application refresh preferences and a current state of the watch (e.g., battery life, whether in active use by a user, how much power such the refresh will use), and may be determined by WSD 229. In some implementations, a user can explicitly request an update to a complication, e.g., by selecting via touch or otherwise activating the complication, such as by voice.

At block 306, the watch can request new complication data, e.g., via WTD 228, CTD 218 can identify the message corresponds to WCD 216 (e.g., because the communication came from the watch). WCD 216 can identify the corresponding companion application. Along with the request for the complication data, the watch can ask for any new refresh preferences. Thus, in some embodiments, the companion application can provide new refresh preferences.

At block 308, the companion application can obtain new complication data in response to the request. For example, companion application 212 can retrieve the complication data from a server. In some implementations, the companion application can request the new complication data from a server, or such new complication data can be pushed to the companion, e.g., periodically. In other implementations, the new complication data can already have been stored by the companion. For example, the companion application can periodically request such data from a server, such as obtaining top news stories on a periodic basis. The companion can make a request to the server to determine any new items, and only obtain items now restored by the companion.

The companion can also determine whether to obtain the new complication data. For example, the companion can decide based on a state of the companion, e.g., battery level per connection state to a network. Thus, a management process of the companion (e.g., CSD 219) can determine whether the companion application gets to run or stops running.

When the new complication data is obtained, the companion application (e.g., by a complication controller) can create an update object that includes the new complication data. The update object can specify a particular template for displaying the new data. In other embodiments, the watch application can specify the particular template.

At block 310, the companion can determine whether to send the new complication data. Such a determination can be made by a WCD 216, which can track the complications that are in current use by the watch, and potentially be affected by other state information about the watch (e.g., a connectivity state and resources), as may be determined by CSD 219. Such a determination can be selectively made, e.g., the new complication data may have taken more than a threshold amount of time to obtain, and thus operations of the watch may have changed. Such a determination can also be made with respect to other communications involving watch, e.g., a file may be in the process of being transferred.

At block 312, the new complication data is sent to the watch, e.g., when it has been determined that the new complication data can be sent. New refresh preferences can also be sent in a same time, e.g., in a same message. The new preferences can specify a preferred time for when the watch is to request the next update for the particular complication application.

At block 314, the watch can update the corresponding complication. In some embodiments, the new complication data can be sent in a specific format (e.g., from a complication controller in the watch) that identifies a particular template for displaying the data in a corresponding style window. A display manager can interpret the data corresponding to the particular template in an update of the complication. The particular template may be one of the plurality of predetermined templates for the style window selected for showing the complication. The display manager can use a particular template along with other settings of the watch face (e.g., color).

In this manner, the watch can control how often the complication data is updated. Otherwise, a companion application corresponding to a complication on an active watch face can cause unwanted processing on the watch. Such control of the complication data can reduce instances where the watch gets unnecessarily slowed down by new data from companion applications.

As an example, a complication can correspond to a sports application, which may provide scores for a particular game. In such an example, an app extension of the sports application can send user preferences to the watch, indicating a particular start time for when updated scores may be desired for showing in the complication. The watch may then not send any requests for new data until the start time, and thus the watch can save power.

The user preferences of the sports application can also indicate a preferred refresh rate once the game starts. An application may have a certain allotment of refreshes to a complication during a day, then thus the sports application can determine a particular refresh rate based on an expected length of time for the game for its given allotment of refreshes. The watch can then send requests based on the preferred refresh rate, and the sports application can retrieve the scores at that time or provide the scores if the scores had previously been retrieved.

2. Push

FIG. 3B shows a flowchart of a method 350 where a particular companion application provides an update to complication data to the watch according to embodiments of the present invention. Various blocks of method 350 can be optional. Method 350 can be performed in logic of the companion can manage transmission of new data to the watch, e.g., so as not to overburden the watch and drain the battery.

At block 352, the watch can send refresh preferences to the corresponding companion application. The refresh preferences can be sent at various times, e.g., once a day or multiple times during the day. The refresh preferences can include current state information of the watch, which may be used by the companion to determine an appropriate refresh rate for pushing new data to the watch. As examples, the refresh preferences can be determined by display manager 240 and/or WSD 229

At block 354, a trigger can be received by the companion. In various embodiments, the trigger can be a periodic trigger generated by a system routine on the companion (e.g., a watch communications daemon) or by the companion application. As another example, the companion application can receive a push from the server when new data occurs (e.g., a new score happens). This new score can act as a trigger to send new complication data to the watch. Such uses for when a new score happens may be suitable for certain sports with low-scoring, such as soccer and hockey, and potentially football. Updating only when there is a score can save battery life, compared to periodic refreshes. Even with scoring updates, updates may be provided at certain times, e.g., at end of quarters or at halftime.

At block 356, new complication data can be obtained. The new data can be obtained in a variety of ways. The new data can be obtained (e.g., by companion application 212) from a server after the trigger has been received, e.g., when the trigger is a periodic, internal trigger. The new complication data can also be received as a push from a corresponding server (e.g., a server a user has subscribed to for push notifications), where a notification of the new data can act as a trigger.

At block 358, the companion determines whether the new data can be sent for the particular companion application. This determination can be made by various modules, e.g., by a watch communications daemon (WCD). The WCD can track which watch applications are running, e.g., by tracking which complications are being used on an active watch face. If an active watch complication corresponds to the companion application providing the new data, then the WCD can determine it is suitable to send the new data. The WCD can manage the number of updates to ensure that the number of updates does not violate any policy limits for updating complications.

In some embodiments, WCD can wait until the watch initiates communication with the companion, and then send any new data. In this manner, the companion knows that the watch is awake and there is no concern about having to wake the watch up with a push. In other embodiments, a push can be allowed, e.g., for a companion application or messages flagged as special. When a message is flagged as special, the companion can know that the message can be pushed to the watch to wake up the corresponding watch application, e.g., when a corresponding complication is active on a watch face.

At block 360, the new data is sent to the watch, e.g., as in block 312.

At block 362, the complication is updated, e.g., as in block 314.

In one example, a companion application can be budgeted to send 30 or 40 (or other number) of updates to the watch per day. If a companion application knows that there is a particular window of activity (e.g., for a sports game), the companion application can budget updates to allow for more during the window. A weather application, however, might spread updates evenly across the entire day.

F. Providing Watch Information to Companion

Watch information can also be sent to the companion. A user might specifically request data to be sent to the companion. As another example, background modes can be used to queue up content that will be delivered to the companion at some time. This may occur when the watch is generating content, and once the data is queued up, that content can be transferred over to the companion. For example, if the watch was tracking health data, the watch can have some sort of process for determining when it is appropriate to send over the data. Such a process can be managed by WSD 329.

G. Budgets

CSD 219 and WSD 229 can use budgets for determining what actions are to be performed by the companion and the watch. As examples, there can be three budgets involved for communications between the devices. There is how many messages can be sent in one day in total between a server and the companion, for a particular application, and for a particular type of message (e.g., push by a server or a request from the companion). Another class of budget is how many times the system going to choose to launch an application in the background, e.g., to obtain new data or process the new data. Another class of budget is how many times messages can be sent between the companion and the watch in one day in total between the watch and the companion, for a particular application, and for a particular type of message (e.g., push by companion or a request from the watch).

As an example, for a weather application, it may only need to check at certain times, e.g., 9:00 a.m. because that is when the user wakes up. But, the weather application may want to update every hour, but that may be too much for the budget determined by a sampling daemon. In some embodiments, there can be a hybrid model where an application wants to update every half an hour, but the application also wants to be able to receive pushes. A budget can be tracked across both devices, e.g., a complication budget for actions on both devices.

If a budget is used up, certain updates at the end of the day may not be sent. For example, if an application wants an update every 10 minutes, then towards the end of that day, the budget may be used up. Further, the messages at the end of the day may not be allowed to be high priority because they consumed the budget doing the scheduled update.

CSD 219 can determine whether a message is to be sent based on the budget, e.g., whether a message sent through WCD 216. The message can go through immediately when CSD approves, but otherwise the message can be queued, e.g., in queue 217. Or, the message can be dropped and the companion application can try later.

II. Background Operation Modes

The two background operation modes include an Update Application Context mode and a Transfer File mode. These modes operate in a background mode to support data transfers from the companion device to the personal device. By operating as a background process, these modes do not interfere with the user experience of using the devices. Two devices comprising a companion device and an accessory device are paired and reachable when they can communicate with one another over an active communication session. If the two devices are not able to communicate with one another, then they are not reachable, and are not considered to be paired. As background schemes, a third party application that requests data transfer through one of these modes will be supported such that data to be transferred from the companion device to the personal device will be held in the companion device if the watch application is not reachable. If the watch application is reachable, then the transfer of data will take place from the companion device to the personal device. A similar scheme applies for data transfers from the personal device to the companion device. Thus, in the background operation, the companion device will not initiate operation of the watch application.

The respective paired applications comprising the companion application and watch application may be configured by the third party application provider to operate between the interactive mode and background mode, as described further below. For the Update Application Context type of background mode, the companion application generally manages update of application context information, for pushing data to the watch application. For the Transfer File type of background mode, the companion application first checks to determine if the personal device has sufficient memory space to accept the requested data transfer. If so, then the companion application will permit the transfer of the requested data file, unless the personal device is operating on stored electrical power (i.e., not being recharged). In the case of stored energy operation, the File Transfer type of background mode will permit up to two minutes of data transfer activity before the transfer operation is paused. Transfer will resume upon the next application of recharging power.

Figure 4:
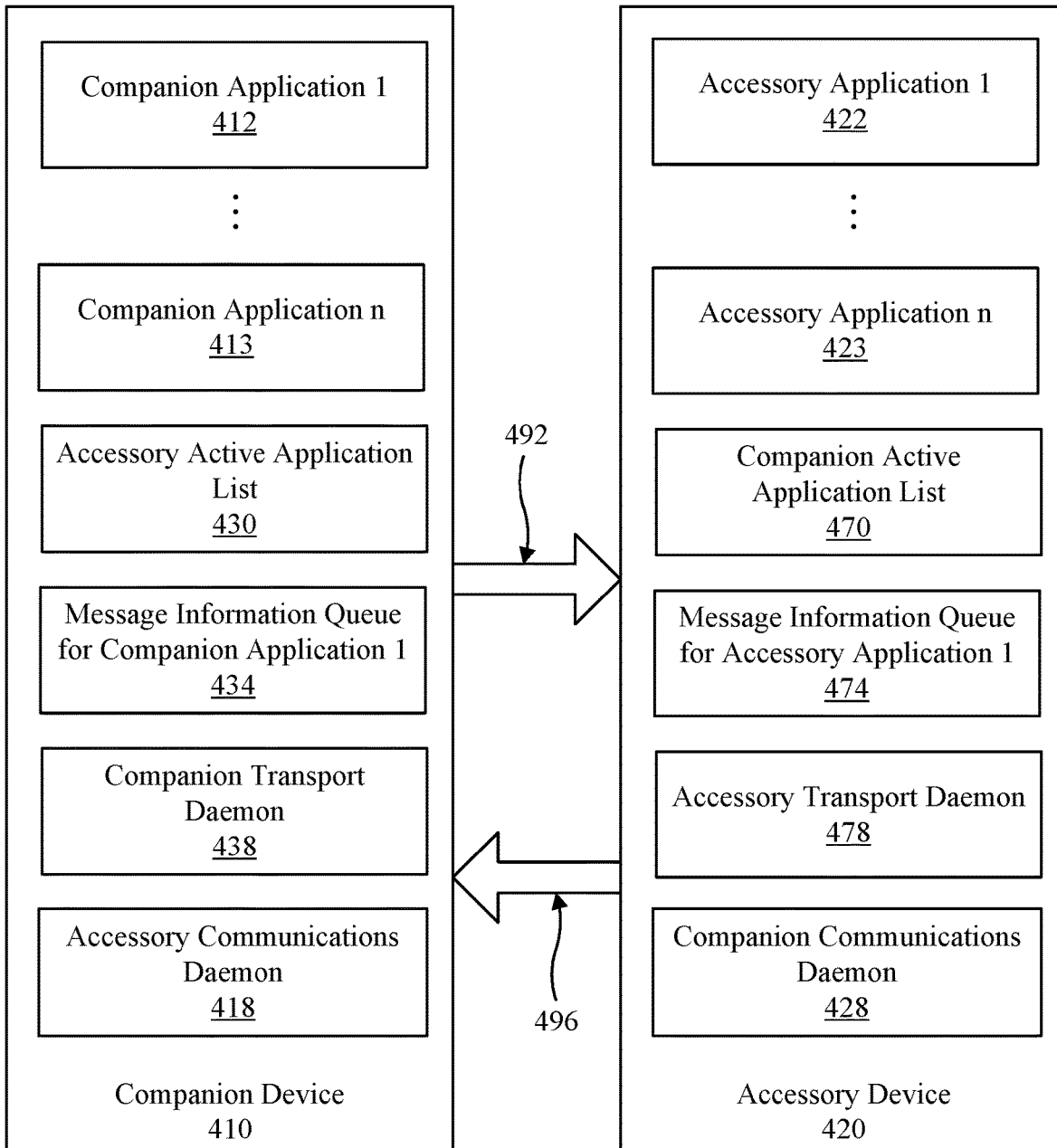
FIG. 4 is a block diagram of a companion device and accessory device configured according to embodiments of the present invention.

FIG. 4 shows a block diagram of a companion device and accessory device configured according to embodiments of the present invention. For simplicity of illustration, only one application in each respective device is depicted, along with an nth respective application. Thus, the companion device 410 includes a "Companion Application 1" 412 and additional applications through a "Companion Application n", and the accessory device (watch) 420 includes an "Accessory Application 1" 422 and additional applications through an "Accessory Application n". Each respective device maintains a list of active applications, comprising a list of applications installed on the respective host device that are active (that is, applications that are being executed at the host device). Thus, the companion device 410 includes an accessory active application list 430, and the accessory device 420 includes a companion active application list 470. As described further below, each respective host device may transmit its active application list to the corresponding paired device, to inform the paired device as to which applications are active on the host device, whereupon the device having received the active application list stores the list, as illustrated in FIG. 4. Each respective device also includes a respective transport daemon for managing the transfer of data out of and into the device. Thus, the companion device 410 includes a companion transport daemon 438, and the accessory device 420 includes an accessory transport daemon 478.

Each respective device also includes a message information queue for each installed application. The message information queue may be contained in a computer-readable medium of each respective device (see, e.g., FIG. 10). The information that is the subject of the background operations described in this section is stored in the message information queue. The stored information may comprise, for example, mode identifier information that specifies an information type of a corresponding received information message or type of content associated with the received information message. For example, the information type may indicate that the information message relates to, or includes data comprising, a news list update message or data content associated with the information message. The information type may indicate that the information message relates to, or includes, data that specifies a file name of a data file to be transferred and/or specifies a data size of a data file to be transferred. The information type may indicate that the information message relates to, or includes, update information, such as update information for changing at least one display complication at the accessory device.

FIG. 4 shows that the companion device 410 includes a message information queue 434 for the illustrated Companion Application 1 412 and the accessory device 420 includes a message information queue 474 for the illustrated Accessory Application 1 422. When information from a respective information queue 434, 474 is sent from the host device to the paired device, the information is deleted from the respective information queue. The transfer of information from one device to another is managed by the respective device communications daemons (as noted in connection with FIG. 1). Thus, FIG. 4 shows that the companion device 410 includes an accessory communications daemon 418 for managing communications with the accessory device, and the accessory device 420 includes a companion communications daemon 428 for managing communications with the companion device. In FIG. 4, the two arrows 492, 496 show communications between the devices, in the direction of the arrow 492 from the companion device 410 to the accessory device 420, and in the direction of the arrow 496 from the accessory device 420 to the companion device 410. For simplicity of explanation, communications between the devices 410, 420 will be described primarily in the context of communications from the companion device 410 to the accessory device 420. Except as noted herein, however, communications in the other direction, from the accessory device 420 to the companion device 410, occurs in the reverse manner as for communications from the companion device 410 to the accessory device 420.

A. Update Application Context Mode

The application generating the request message (that is, the application with information to provide to the corresponding application on the paired device) can place the information in an information queue, and await processing. Except as noted below, the operation described for the Update Application Context background mode applies to both the companion device and the accessory (watch) device. The device on which the application being described is installed shall be referred to as the host device.

In the context of the description herein, for example, the host device will be described as the companion device, and the paired device will be described as the accessory device (watch). In accordance with the description above, the companion application stores the application information in an information queue of the companion device. The application information is sent from the information queue if the accessory device is paired with and reachable by the companion device, if the corresponding accessory application is active at the accessory device, and if the application information does not exceed a predetermined data size limit. If these conditions are all met, then the information is sent from the queue. The sent application information is deleted from the information queue. If any one of these conditions is not met, then the information queue is left unchanged.

Figure 5:
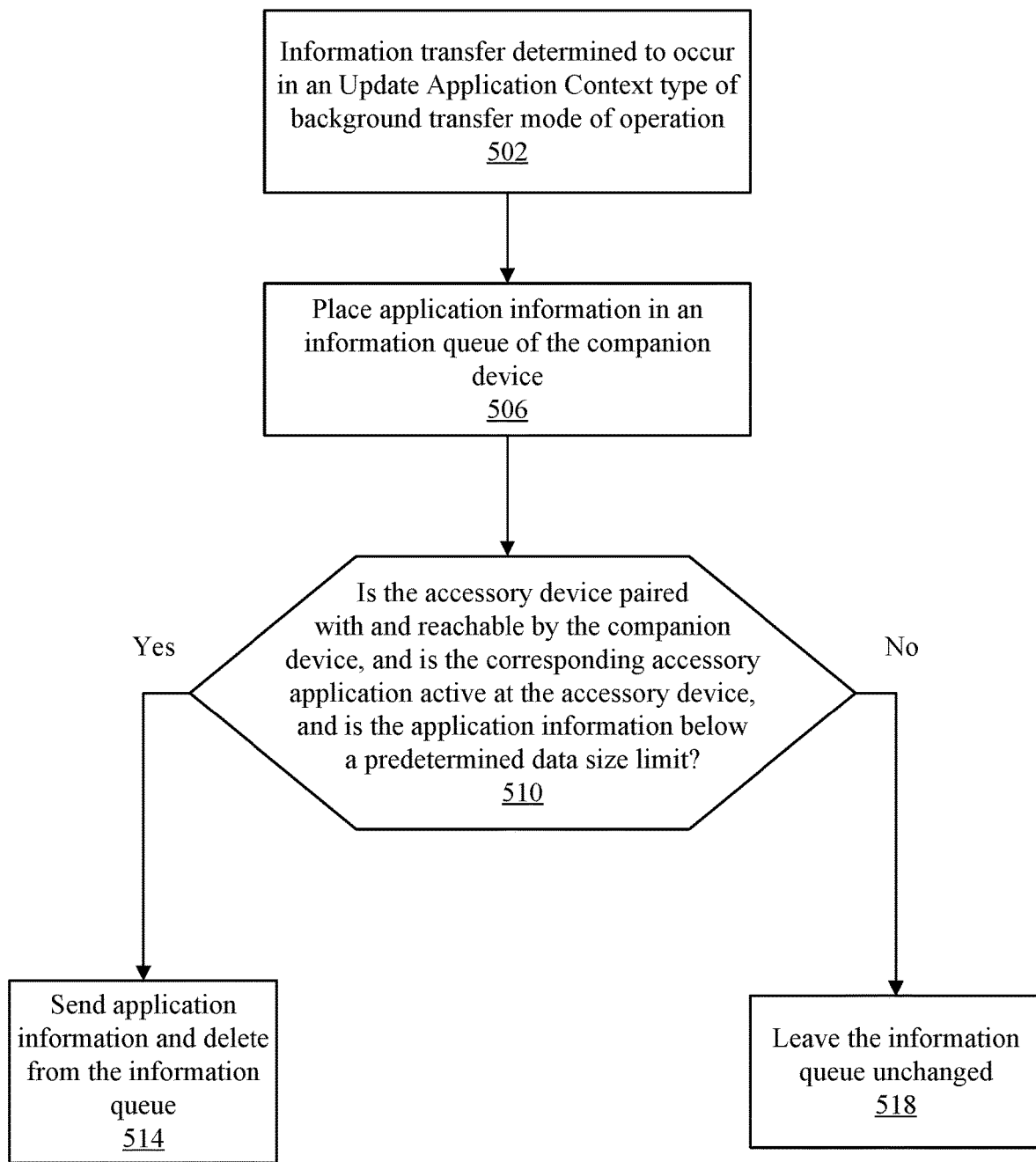
FIG. 5 is a flowchart of a method where the companion device and accessory device communicate with an update application context type of background transfer mode of communication.

FIG. 5 shows the operation for the Update Application Context background mode, starting at the box 502. As described further below, the application itself determines if the information transfer to the paired device should take place according to this background mode, or may decide that the information transfer should occur according to another mode. FIG. 5 shows the operation once the application has determined to use the Update Application Context background mode, at box 502. Thus, under this scenario, the request message for the application information is associated with a background transfer mode of communication operation, wherein the request message is produced from the host application and is directed to a corresponding application installed at the paired device.

At the box 506, the background operation for this mode includes the application placing the application information in an information queue of the host device. The application information is the subject of the request message whose processing under this mode is described in this section. The application information may comprise a variety of data, such as a link or pointer to a datastore, a network address at which content may be retrieved, a data storage disk location where data is stored, an actual data content file, and the like. As noted above, the application, through its program logic, determines when application information should be transferred to the corresponding paired device using the Update Application Context background mode. As part of the processing for this background mode, the application at the companion device 410 places the application information for transfer in the message information queue 434, as indicated at box 506.

At the decision box 510, the application processing determines if conditions are suitable for sending the information to the paired device. The box 510 shows that, in the case of the companion device, according to the update application context type of the background transfer mode of communication, the information is sent from the companion device 410 to the accessory device 420 if the accessory device is paired with and reachable by the companion device, if the corresponding accessory application is active at the accessory device, and if the application information does not exceed a predetermined data size limit. One of the devices 410, 420 is said to be paired and reachable with the other if the devices are communicating via an active, current communication session. As noted above, the respective communications daemons 418, 428 manage communications between the devices. An application installed at a respective device is active at its host device if it is running on the host device. If the application is active, then an application identifier of the application will appear in the respective active application lists 430 and 470.

If all of the conditions in the decision box 510 are met, an affirmative outcome at the box, then the operation of this background mode sends the application information from the queue and deletes the information from the queue, as indicated at the box 514. If any one of the conditions described above is not met, a negative outcome at the decision box, then box 518 shows that the information is not sent and the information queue is not changed.

B. File Transfer Mode

Figure 6:
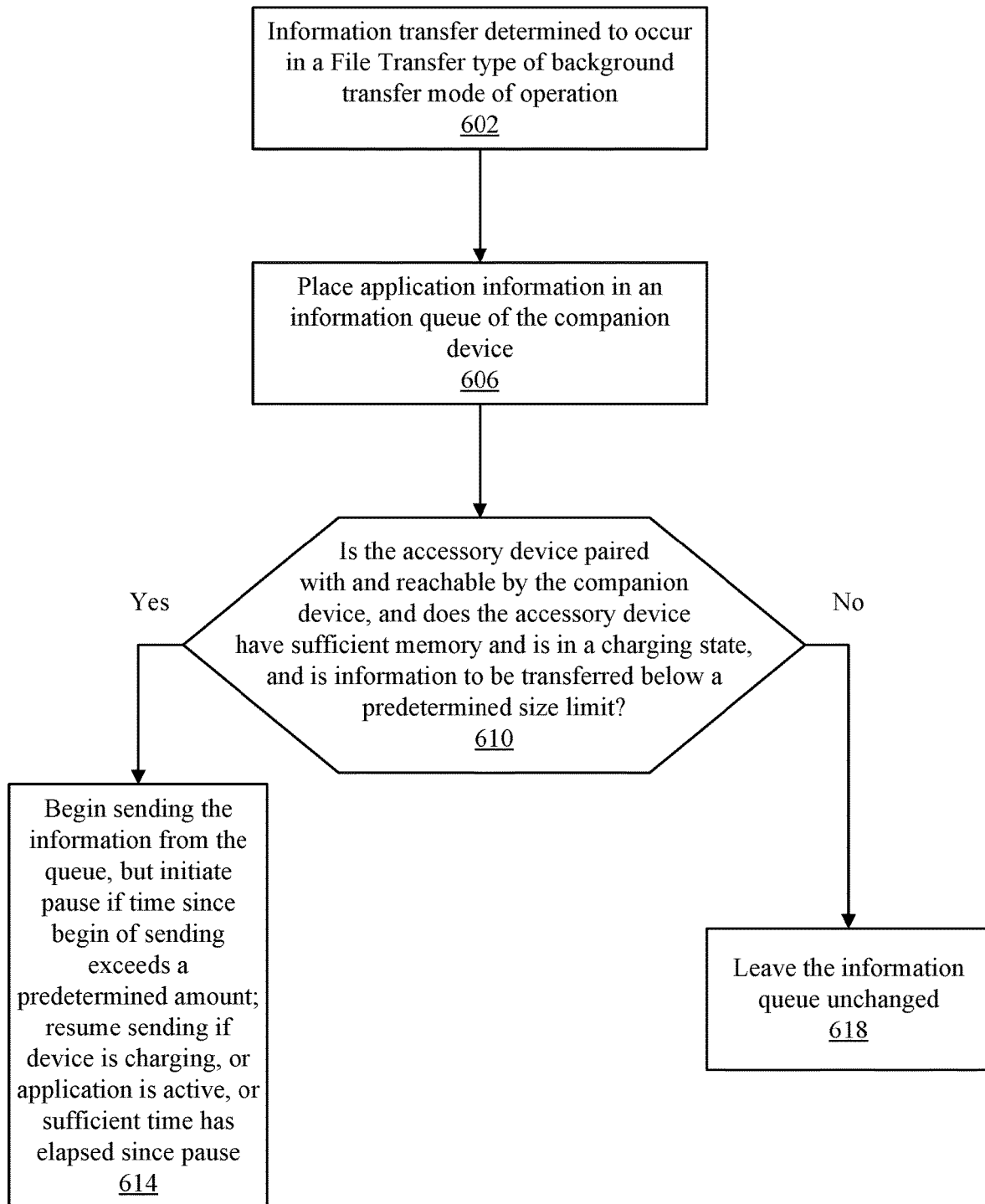
FIG. 6 is a flowchart of a method where the companion device and accessory device communicate with a file transfer type of background transfer mode of communication.

FIG. 6 shows the operation for the File Transfer background mode, starting at the box 602. As described further below, the application itself determines if the information transfer to the paired device should take place according to this background mode, or may decide that the information transfer should occur according to another mode. FIG. 6 shows the operation once the application has determined to use the File Transfer background mode, at box 602. Thus, under this scenario, the request message for the application information is associated with a background transfer mode of communication operation, wherein the request message is produced from the host application and is directed to a corresponding application installed at the paired device.

At the box 606, the background operation for this mode includes the application placing the application information in an information queue of the host device. The application information is the subject of the request message whose processing under this mode is described in this section. The application information may comprise a variety of data, such as a link or pointer to a datastore, a network address at which content may be retrieved, a data storage disk location where data is stored, an actual data content file, and the like. As noted above, the application, through its program logic, determines when application information should be transferred to the corresponding paired device using the File Transfer background mode. As part of the processing for this background mode, the application at the companion device 410 places the application information for transfer in the companion device information queue 434, as indicated at box 606.

At the decision box 610, the application processing determines if conditions are suitable for sending the information to the paired device. The box 610 shows that, in the case of the companion device, according to the update application context type of the background transfer mode of communication, the information is sent from the companion device 410 to the accessory device 420 if the accessory device is paired with and reachable by the companion device, if the corresponding accessory application is active at the accessory device, and if the application information does not exceed a predetermined data size limit. One of the devices 410, 420 is said to be paired and reachable with the other if the devices are communicating via an active, current communication session. As noted above, the respective communications daemons 418, 428 manage communications between the devices. An application installed at a respective device is active at its host device if it is running on the host device. If the application is active, then an application identifier of the application will appear in the respective active application lists 430 and 470.

FIG. 6 shows that the operation of sending the information is more involved for the File Transfer background mode, as compared to the Update Application Context mode. If the information is to be sent, an affirmative outcome at the decision box 620, then the host device begins sending the information from the queue, but will initiate a pause in the sending if a first amount of elapsed time has passed since an initiation of sending the file or other information to be transferred. That is, the sending is paused if the time since the beginning of the sending exceeds a predetermined amount of time. Once paused, the information sending will resume if the host device is in a charging operation, or if the application is active at the host device, or if a sufficient time has elapsed since the start of the pause operation. The sending can be paused if a first amount of elapsed time has passed since an initiation of sending the file to be transferred If all of the conditions in the decision box 610 are met, an affirmative outcome at the box, then the operation of this background mode sends the application information from the queue and deletes the information from the queue, as indicated at the box 614. If any one of the conditions described above is not met, a negative outcome at the decision box, then box 618 shows that the information is not sent and the information queue is not changed.

III. Interactive File Transfer Mode

Figure 7:
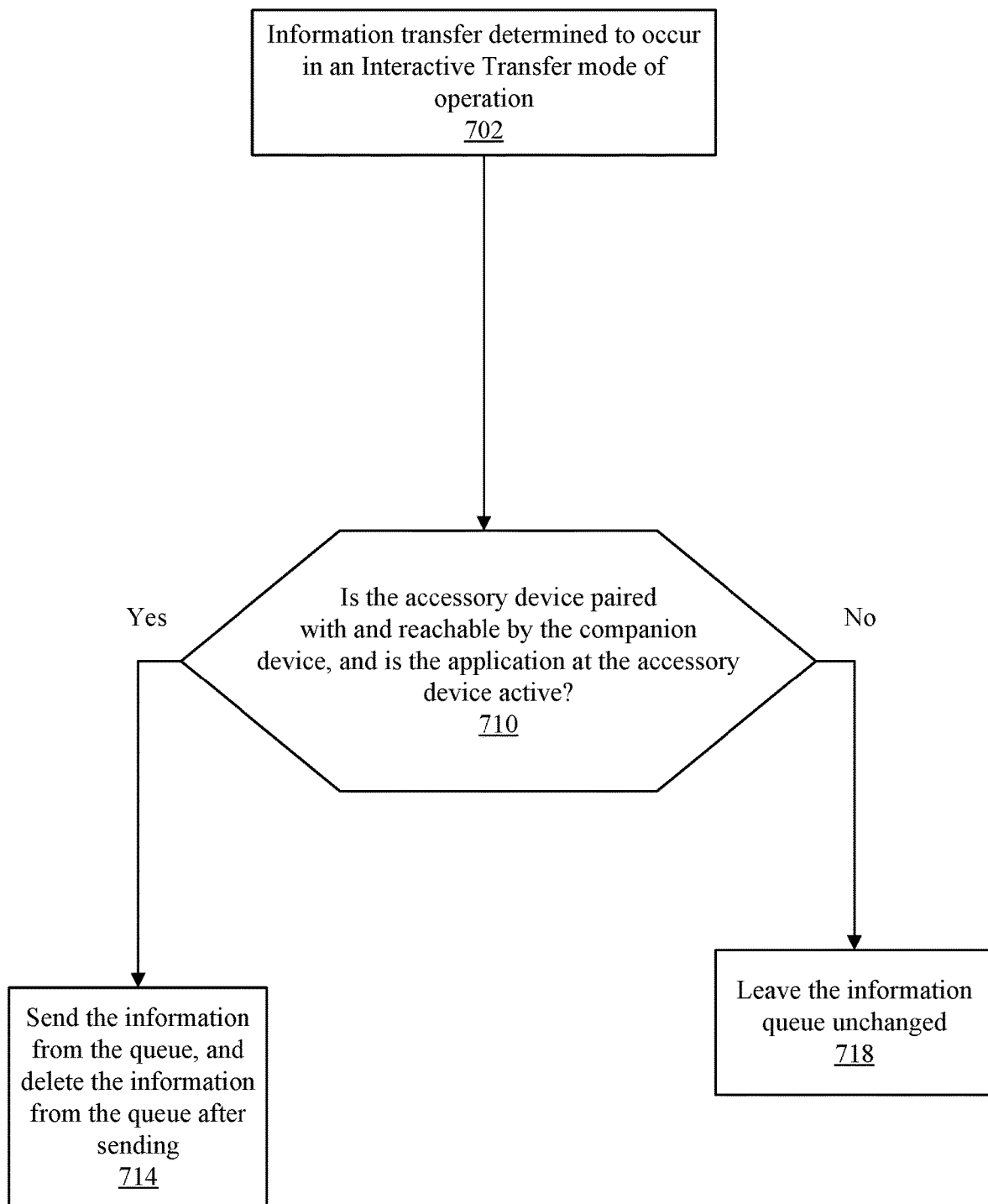
FIG. 7 is a flowchart of a method where the companion device and accessory device communicate with an interactive transfer mode of communication.

FIG. 7 shows the Interactive Transfer mode of operation, in which messages comprising information to be exchanged are sent to the other device only if both devices are already active and the respective applications are deemed reachable. For an application on the companion device, a watch application is reachable only if the accessory device is connected with the companion device via a communication session and the watch application is running (i.e., is being executed and is active) on the accessory device. The watch application is otherwise unreachable to the companion application. As noted above, each device can know what applications are active on the corresponding device because a host device sends its respective active application list to the other corresponding device whenever there is a change to the list, or at predetermined intervals, or both. Thus, any time an application is launched or closed on a host device, that host device will update its active application list.

As with the other operating modes discussed above, the application itself determines if the information transfer to the paired device should take place according to the interactive file transfer mode, or may decide that the information transfer should occur according to another mode. FIG. 7 shows the case where the application has determined to use the Interactive File Transfer mode, at box 702. Thus, under this scenario, the request message for the application information is associated with the interactive file transfer mode of communication operation, wherein the request message is produced from the host application and is directed to a corresponding application installed at the paired device. The application information may comprise a variety of data, such as a link or pointer to a datastore, a network address at which content may be retrieved, a data storage disk location where data is stored, an actual data content file, and the like.

The decision box 710 shows that the companion application decides to send the information if the accessory device is paired with and is reachable by the companion device, and if the application at the accessory device is active. As noted above, each device knows the active applications of the other, by virtue of receiving the respective active application list.

For an application on the accessory device, a companion application is reachable so long as the personal device is connected with the companion device via a communication session. That is, if the watch application is executing on the accessory device, and the accessory device is in a communication session with the companion device, then even if the companion application is asleep (i.e., not executing), the watch application can request that the companion application begin executing, so that data transfer may occur from the accessory device to the companion device.

If the sending conditions are met, an affirmative outcome at the decision box 710, then box 714 shows that the information is sent from the information queue and the sent information is deleted from the queue. Box 718 shows that, if the conditions are not met, a negative outcome at the decision box 710, then the information is not sent and the queue is unchanged.

IV. Sending Messages from the Accessory Device to the Companion Device

As noted above, most message information transfer can take place from the companion device to the accessory device and vice versa, in a symmetric fashion. One type of data transfer that is uni-directional is the transfer of information from the accessory device to the companion device, generally in the case where the accessory device comprises a watch having complications on its display (dynamic icons on its watch face). For an active complication, that is, an icon being displayed and updated on the display, it may be important for the companion device to know the status or display value of a complication. In such cases, information messages may be sent from the accessory device to the companion device, so as to provide such display information, and the information may be automatically pushed from the watch to the companion device, so that current display values are provided to the companion device.

Details of such sending and dynamic updating are described in a co-pending U.S. patent application entitled "Obtaining And Displaying Time-Related Data On A Smart Watch", Application No. 62/171,952.

V. Sending from the Companion Device to the Accessory Device

Figure 8:
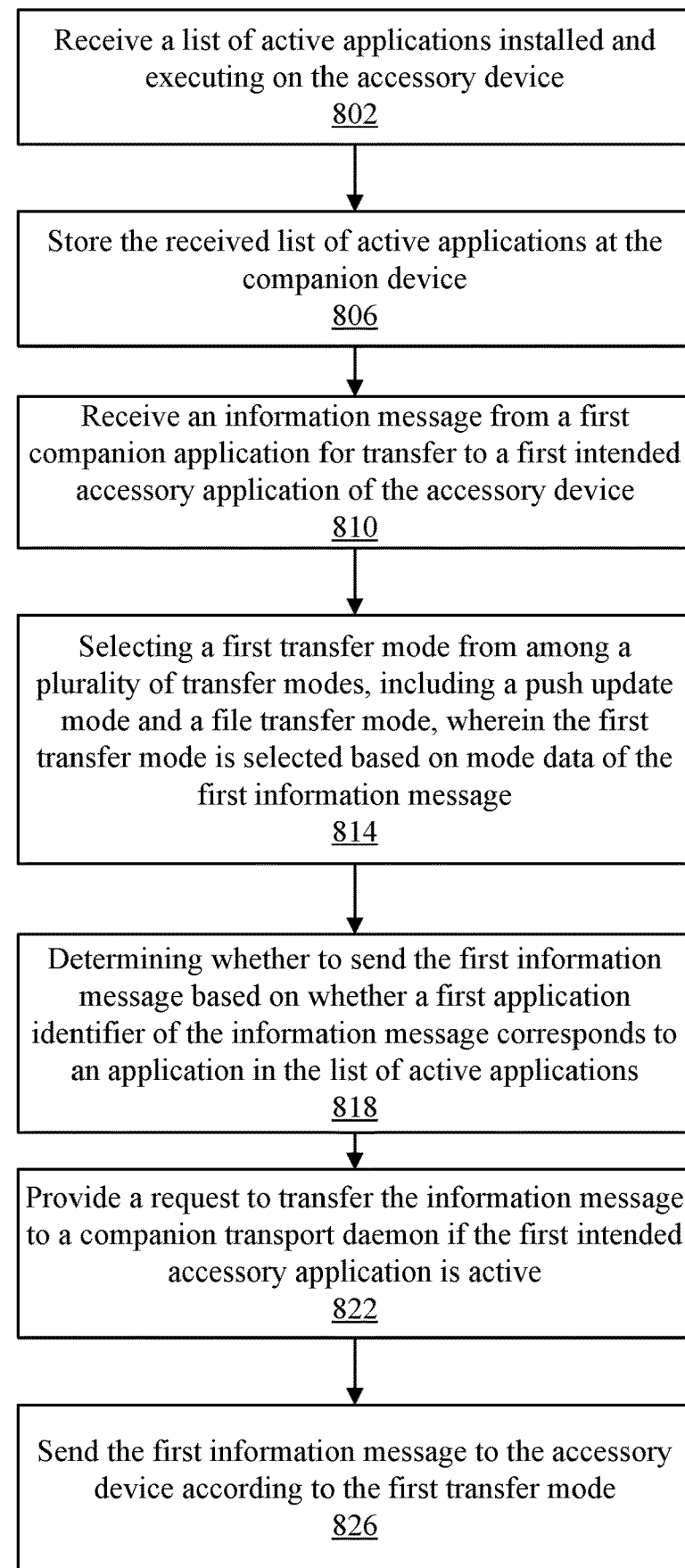
FIG. 8 is a flowchart of a method that illustrates sending an information message from the companion device to the accessory device.

FIG. 8 shows a flowchart of sending an information message from the companion device to the accessory device. At the box 802, the companion device receives a list of active applications that are installed and executing on the accessory device. The companion device receives this list from the accessory device. The list is sent whenever there is a change to the list, such as when an application is installed or when an installed application is launched or closed. The devices also may operate so as to send the list of active applications at predetermined intervals of time, in addition or in place of sending when there is a change. At the box 806, the received list of active applications can be stored in memory at the companion device. As described further herein, the list of active applications can be used in determining the circumstances for sending and the rule set to be followed in doing so.

At box 810, an information message is received (i.e., is generated) by a companion application for transfer of the message to a first application. The information message is received by an accessory communications daemon, and comprises a first information message from a first companion application, for transfer of the first information message to a first intended accessory application of the accessory device. As noted above, multiple applications may be installed at the devices. Box 810 illustrates that the environment may encompass multiple applications on the respective devices. At box 814, an accessory communications daemon selects a first transfer mode from among a plurality of transfer modes for transferring the first information message to the first intended accessory application. The plurality of transfer modes includes a push update mode and a file transfer mode. The first transfer mode is selected based on mode data of the first information message. The mode data can be of various types. For example, the mode data can be a specific identifier that identifies the mode to use. The mode data can be information about the type of data to transfer, e.g., whether a file or push information is to be transferred. The mode data can specify whether an internal trigger causes the transfer request (e.g., for a push update) or whether it was a person, e.g., requesting a file transfer.

Box 818 shows that the companion device determines whether to send the first information message to a companion transport daemon of the companion device based on whether a first application identifier of the information message corresponds to an application in the list of active applications.

At box 822, the request to transfer the information message is provided to the companion transport daemon of the companion device in response to the first intended accessory application being on the list.

Box 826, the companion transport daemon sends the first information message to the accessory device according to the first transfer mode. The message may include application information, which may comprise, for example, news stories for publication and update, or may comprise links to data files, or may comprise files themselves.

VI. Sending Among Multiple Installed Applications

Figure 9:
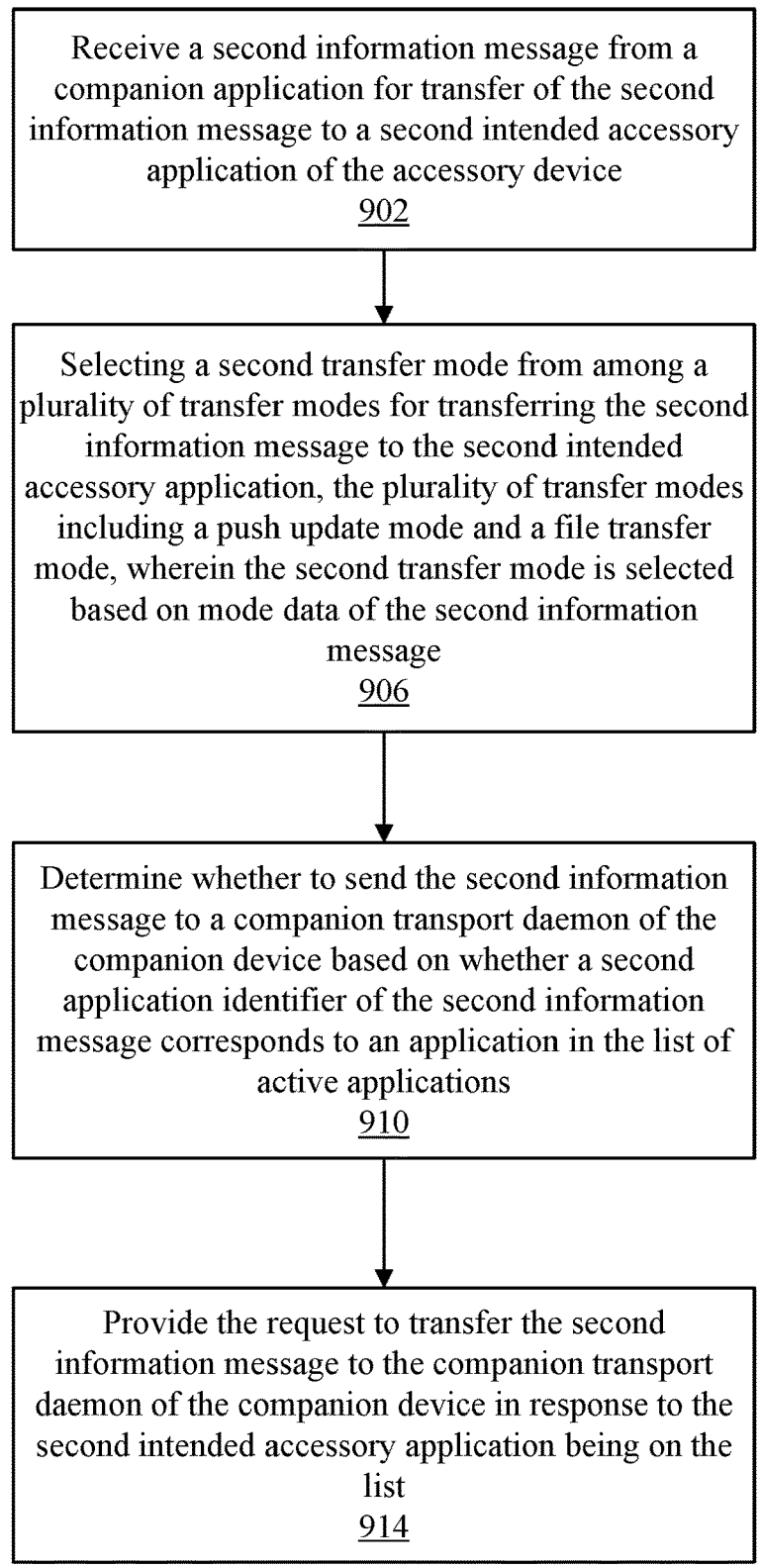
FIG. 9 is a flowchart of a method that illustrates sending an information message of an application from among multiple applications.

As noted above, multiple applications may be installed at the devices. FIG. 9 is a flowchart that shows how the correct application among multiple applications is determined, for sending information messages to the correct application.

Box 902 shows that an information message for transfer to a second intended accessory application of the accessory device is received. That is, a second information message is received from a companion application for transfer of the second information message to a second intended accessory application of the accessory device. In the scenario contemplated by FIG. 9, there are at least two applications installed on each of the companion and accessory devices. Each information message includes an application identifier, for an application with which the information message is associated.

In box 906, a second transfer mode is selected, by an accessory communications daemon, from among a plurality of transfer modes for transferring the second information message to the second intended accessory application. The plurality of transfer modes include a push update mode and a file transfer mode, where the second transfer mode is selected based on mode data of the second information message.

At box 910, a transfer mode for transferring the information message to the second intended accessory application is determined. That is, box 910 relates to determining whether to send the second information message to a companion transport daemon of the companion device, based on whether a second application identifier of the second information message corresponds to an application in the list of active applications. An information message that is received and is associated with a second (or other particular) application will only be transferred, or sent, to a corresponding application installed on the paired device.

At box 914, the request to transfer the second information message is provided to the companion transport daemon of the companion device in response to the second intended accessory application being on the list. Additional transfer modes may be provided. For example, described herein are modes disclosed as an interactive transfer mode and a complication update mode.

VII. Computing Devices

Figure 10:
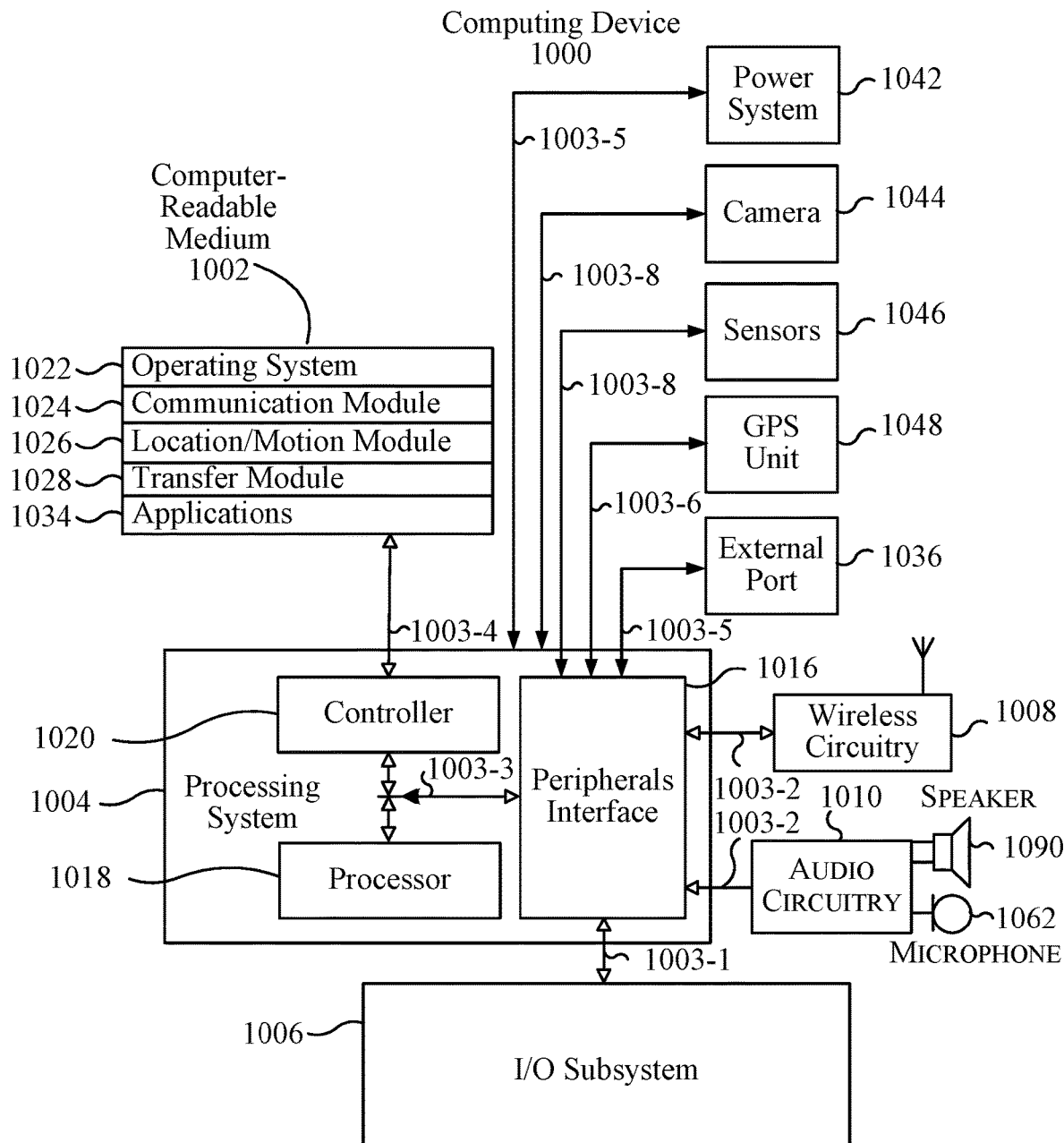
FIG. 10 is a block diagram of a computer processing system that may comprise any of the computing devices and may be used to provide the operation described herein.

FIG. 10 is a block diagram of a data processing system 1000, which may be used with one embodiment of the invention. For example, the system 1000 may be used as part of the server device 102 and/or the client devices 106, 110, as shown in FIG. 1. The system 1000 generally includes a computer-readable medium 1002, a processing system 1004, an Input/Output (I/O) subsystem 1006, wireless circuitry 10010, and audio circuitry 1010 including a speaker 10100 and a microphone 1052. These components may be coupled by one or more communication buses or signal lines 1003. The device 1000 can be any electronic computing device, including a wearable computer device, a handheld computer, a tablet computer, a desktop computer, a mobile phone, laptop computer, tablet device, media player, personal digital assistant (PDA), a key fob, a car key, an access card, a multi-function device, a mobile phone, a portable gaming device, or the like, including a combination of two or more of these items. As examples, a wearable device can comprise a wrist worn device, a device that is clipped or pinned to the user's clothing, a device with a lanyard or chain that is wearable around the user's neck, a headband device, eyeglasses, or any other device that can be secured to the user's person or clothing.

It should be apparent that the architecture shown in FIG. 10 is only one example of an architecture for the computing device 1000, and that the device 1000 can have more or fewer components than shown, or a different configuration of components. The various components shown in FIG. 10 can be implemented in hardware, software, or a combination of both hardware and software, including one or more signal processing and/or application specific integrated circuits.

Wireless circuitry 1008 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, and the like. In some embodiments, the wireless circuitry 1008 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WiFi (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol, including communication protocols not yet developed as of the filing date of this document. A mobile device can include wireless circuitry that can communicate over several different types of wireless networks depending on the range required for the communication. For example, a short-range wireless transceiver (e.g., Bluetooth), a medium-range wireless transceiver (e.g., WiFi), and/or a long range wireless transceiver (e.g., GSM/GPRS, UMTS, CDMA2000 1×/EV-DO and LTE/LTE-Advanced) can be used depending on the type of communication or the range of the communication.

The wireless circuitry 1008 is coupled to the processing system 1004 via a peripherals interface 1016. The interface 1016 can include conventional components for establishing and maintaining communication between peripherals and the processing system 1004. Voice and data information received by the wireless circuitry 1008 (e.g., in speech recognition or voice command applications) is sent to one or more processors 1018 via the peripherals interface 1016. One or more processors 1018 are configurable to process various data formats for one or more application programs 1034 stored on the medium 1002.

The peripherals interface 1016 couples the input and output peripherals of the device to a processor 1018 and the computer-readable medium 1002. One or more processors 1018 communicate with the computer-readable medium 1002 via a memory controller 1020. The computer-readable medium 1002 can be any device or medium that can store code and/or data for use by one or more processors 1018.

The computer-readable medium 1002 can include a memory hierarchy, including cache, main memory, and secondary memory. The memory hierarchy can be implemented using any combination of RAM (e.g., SRAM, DRAM, DDRAM), ROM, FLASH, and magnetic and/or optical storage devices, such as disk drives, magnetic tape, CDs (compact disks) and DVDs (digital video discs). In some embodiments, the peripherals interface 1016, one or more processors 1018, and the memory controller 1020 can be implemented on a single chip, such as processing system 1004. In some other embodiments, they can be implemented on separate chips.

The computing device 1000 also includes a power system 1042 for powering the various hardware components. The power system 1042 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, the computing device 1000 includes a camera 1044. In some embodiments, the computing device 1000 includes sensors 1046. The sensors can include accelerometers, compass, gyrometer, pressure sensors, audio sensors, light sensors, barometers, and the like. The sensors 1046 can be used to sense location aspects, such as auditory or light signatures of a location.

In some embodiments, the computing device 1000 can include a GPS receiver, sometimes referred to as a GPS unit 1048. A computing device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the computing device. Based on these estimations, the computing device can determine a location fix, altitude, and/or current speed. A location fix can be geographical coordinates such as latitudinal and longitudinal information.

One or more processors 1018 run various software components stored in the medium 1002 to perform various functions for the computing device 1000. In some embodiments, the software components include an operating system 1022, a communication module (or set of instructions) 1024, a location module (or set of instructions) 1026, a transfer module 1028, a synchronization module 1030, and other applications (or sets of instructions) 1034, such as a navigation app. Transfer module 1028 can operate to manage transfer of data to an accessory device, e.g., as described herein.

The operating system 1022 can be any suitable operating system, including iOS, Mac OS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

The communication module 1024 facilitates communication with other devices over one or more external ports 1036 or via the wireless circuitry 1008 and includes various software components for handling data received from the wireless circuitry 1008 and/or external port 1036. The external port 1036 (e.g., USB, FireWire, Lightning connector, 30-pin connector, etc.) is adapted for coupling directly to other devices or indirectly over a network (e.g., the Internet, wireless LAN, etc.).

The one or more applications 1034 on the computing device can include any applications installed on the computing device 1000, including without limitation, a browser, address book, contact list, email, instant messaging, word processing, keyboard emulation, widgets, JAVA-enabled applications, encryption, digital rights management, voice recognition, voice replication, a music player (which plays back recorded music stored in one or more files, such as MP3 or AAC files), and the like. The one or more applications 1034 can also include specific applications for generating and receiving request messages, performing data transfers, and performing actions at each respective device, or any other suitable application.

There may be other modules or sets of instructions (not shown), such as a graphics module, a time module, and the like. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

The I/O subsystem 1006 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, the I/O subsystem 1006 can include a display and user input devices such as a keyboard, mouse, and/or trackpad. In some embodiments, the I/O subsystem 1006 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in the medium 1002) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the I/O subsystem 1006 can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 1000 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's computing device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Computer programs incorporating various features of the present invention may be encoded on various computer readable storage media; suitable media include magnetic disk or tape, optical storage media such as compact disk (CD) or DVD (digital versatile disk), flash memory, and the like. Computer readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Although the invention has been described with respect to specific embodiments, it will be appreciated that the invention is intended to cover all modifications and equivalents within the scope of the following claims.

What is claimed is:

1. A method of data transfer from a mobile device to a wearable device, the method comprising, at the mobile device:
   receiving, by an accessory communications daemon of the mobile device, an information message from a first mobile application, the information message comprising application information intended for an accessory application of the wearable device, wherein the wearable device is paired with the mobile device;
   storing, by the accessory communications daemon, the application information in a queue;
   determining whether to transmit the application information to the accessory application of the wearable device based on whether the wearable device is in a charging state;
   causing transmitting, by the mobile device, of the application information to the accessory application of the wearable device based on the wearable device being in the charging state and being reachable;

pausing transmission of the application information based on a first threshold period of time elapsing since a beginning of the transmission;

transmitting the application information is based on the wearable device being in the charging state or causing the application information to remain in the queue occurs after pausing transmission of the application information; and causing the application information to remain in the queue after pausing of the application information:

determining whether a data size of the application information is below a predetermined size limit, wherein causing the application information to be transmitted or remain in the queue is further based on whether the data size of the application information is below the predetermined size limit.

2. The method of claim 1, further comprising:
determining whether the accessory application is active on the wearable device, wherein causing the application information to be transmitted or remain in the queue is further based on determining whether the accessory application is active on the wearable device.

3. The method of claim 1, further comprising:
determining that a second threshold time has elapsed since pausing, wherein causing the application information to be transmitted or remain in the queue is further based on determining whether the second threshold time has elapsed since pausing.

4. The method of claim 1, wherein the information message comprises a mode identifier that specifies an information type of the information message and a data size of the application information to be transmitted.

5. The method of claim 4, wherein the mode identifier corresponds to a file transfer mode of a plurality of file transfer modes.

6. The method of claim 5, further comprising selecting, by the accessory communications daemon, the file transfer mode from among the plurality of file transfer modes for transferring the information message to the accessory application, wherein the file transfer mode is selected based on the mode identifier of the information message.

7. The method of claim 6, wherein a protocol associated with the file transfer mode specifies a first set of criteria that the wearable device is in the charging state or the application information is below a predetermined size limit.

8. The method of claim 7, wherein different file transfer modes of the plurality of file transfer modes are associated with different protocols that specify different sets of criteria for determining when to transmit received application information.

9. The method of claim 1, further comprising:
subsequently, determining the wearable device is in a non-charging state causing other application information to remain in the queue, thereby preserving an amount of batter power of the wearable device.

10. A computer product comprising a non-transitory computer readable medium storing instructions that, when executed on one or more processors of a mobile device, cause data transfer from the mobile device to a wearable device paired to the mobile device, the instructions comprising:

receiving, by an accessory communications daemon of the mobile device, an information message from a first companion application, the information message comprising application information intended for an accessory application of the wearable device;

storing, by the accessory communications daemon, the application information in a queue;

determining whether to transmit the application information to the accessory application of the wearable device based on whether the wearable device is in a charging state;

causing transmitting, by the mobile device, of the application information to the accessory application of the wearable device based on the wearable device being in the charging state and being reachable;

pausing transmission of the application information based on a first threshold period of time elapsing since a beginning of the transmission;

transmitting the application information is based on the wearable device being in the charging state or causing the application information to remain in the queue occurs after pausing transmission of the application information; and causing the application information to remain in the queue after pausing of the application information;

determining whether a data size of the application information is below a predetermined size limit, wherein causing the application information to be transmitted or remain in the queue is further based on whether the data size of the application information is below the predetermined size limit.

11. The computer product of claim 10, the instructions further comprising:
determining whether the accessory application is active on the wearable device, wherein causing the application information to be transmitted or remain in the queue is further based on determining whether the accessory application is active on the wearable device.

12. The computer product of claim 10, the instructions further comprising:
determining that a second threshold time has elapsed since pausing, wherein causing the application information to be transmitted or remain in the queue is further based on determining whether the second threshold time has elapsed since pausing.

13. The computer product of claim 10, wherein the information message comprises a mode identifier that specifies an information type of the information message and a data size of the application information to be transmitted.

14. The computer product of claim 13, wherein the mode identifier corresponds to a file transfer mode of a plurality of file transfer modes.

15. The computer product of claim 14, further comprising selecting, by the accessory communications daemon, the file transfer mode from among the plurality of file transfer modes for transferring the information message to the accessory application, wherein the file transfer mode is selected based on the mode identifier of the information message.

16. The computer product of claim 15, wherein a protocol associated with the file transfer mode specifies a first set of criteria that the wearable device is in the charging state or the application information is below a predetermined size limit.

17. A mobile device comprising:
a display;
a memory;
one or more processors that are communicably coupled with the display and the memory and that are configured to:
receive, by an accessory communications daemon of the mobile device, an information message from a first companion application, the information message comprising application information intended for an accessory application of a wearable device paired to the mobile device;
store, by the accessory communications daemon, the application information in a queue;
determine whether to transmit the application information to the accessory application of the wearable device based on whether the wearable device is in a charging state;
cause transmission, by the mobile device, of the application information to the accessory application of the wearable device based on the wearable device being in the charging state and being reachable; and
pause transmission of the application information based on a first threshold period of time elapsing since a beginning of the transmission;
transmit the application information is based on the wearable device being in the charging state or causing the application information to remain in the queue occurs after pausing transmission of the application information; and
causing the application information to remain in the queue after pausing of the application information;
determining whether a data size of the application information is below a predetermined size limit, wherein causing the application information to be transmitted or remain in the queue is further based on whether the data size of the application information is below the predetermined size limit.

* * * * *